United States Patent [19]
Motegi

[11] Patent Number: 5,777,445
[45] Date of Patent: Jul. 7, 1998

[54] DRIVE DEVICE OF VIBRATION ACTUATOR

[75] Inventor: Kiyoshi Motegi, Yokohama, Japan

[73] Assignee: Nikon Corporation, Tokyo, Japan

[21] Appl. No.: 761,818

[22] Filed: Dec. 6, 1996

[30] Foreign Application Priority Data

Dec. 7, 1995 [JP] Japan ................... 7-318866

[51] Int. Cl.[6] ................... H02N 2/00
[52] U.S. Cl. ................... 318/114; 310/317
[58] Field of Search ........... 318/114, 126–130, 318/317; 310/317

[56] References Cited

FOREIGN PATENT DOCUMENTS

| 62-2869 | 1/1987 | Japan . |
|---|---|---|
| 1-136575 | 5/1989 | Japan . |
| 62-92781 | 4/1998 | Japan . |

*Primary Examiner*—Steven L. Stephan
*Assistant Examiner*—Judson H. Jones

[57] ABSTRACT

A drive device of a vibration actuator to cause stable driving of a vibration actuator without causing the occurrence of a cogging phenomenon. In a drive device of a vibration actuator using mechanical vibrating motion of an electromechanical energy converting element which converts electrical energy into mechanical energy, the drive device includes a control circuit to output a control signal of a frequency to drive the electromechanical conversion element, a drive circuit to impress on the electromechanical conversion element an alternating voltage of the same frequency as the drive signal, and a direct current power supply to supply electric power to the drive circuit. The drive circuit has an inductive element connected in series or in parallel with the electromechanical conversion element, and a switching element to open and close at the same frequency as the control signal, connected such that the voltage of the direct current power supply is impressed thereon. The control circuit limits the range of variation of the frequency of the control signal, based on the current value which flows in the switching element.

10 Claims, 11 Drawing Sheets

FIG. 5(B) SIGNAL $S_S$ "H" "L"

FIG. 5(C) SIGNAL $S_H$ "H" "L"

FIG. 5(D) SIGNAL $S_r$ "H" "L"

DRIVE DEVICE OF VIBRATION ACTUATOR

BACKGROUND OF THE INVENTION

1. Field of the Invention

The present invention relates to a drive element of a vibration actuator. More particularly, the present invention relates to a drive element that drives the vibration actuator by the mechanical vibrations generated by an electromechanical energy converting element.

2. Description of the Related Art

FIGS. 9(A)–9(C) are diagrams showing the general constitution of a prior art vibration actuator. FIG. 9(A) is a cross-sectional diagram of a vibration actuator, which is constituted by a rotor including a mutually adhered rotor 100-1 and sliding element 100-2, and a stator including a similarly mutually adhered elastic body 100-3 and a vibration body 100-4. When these elements are driven, the rotor and stator are placed in compressive contact (not indicated in the drawing).

FIG. 9(B) is a plan view showing the arrangement of electrodes of the vibration body 100-4. Electrodes 100-4a and 100-4b are input-electrodes. The rotor is frictionally driven by a traveling wave formed in the stator by impressing alternating voltages having a phase difference of 90° or 270° (−90°) in mutual phase, at a frequency which was decided for each vibration actuator 100, on these electrodes. Moreover, the electrode 100-4c is a common ground connection electrode. The electrode 100-4d is an electrode used to tap off a monitoring voltage, and is an electrode which does not directly contribute to the vibration of the vibration body 100-4.

FIG. 9(C) shows the equivalent circuit between the input electrode 100-4a or 1004b of the vibration body 100-4 and the ground connection electrode. This equivalent circuit is represented by a self capacitance $C_0$ and an LCR series circuit connected in parallel with $C_0$. It is considered that the magnitude of the current, termed "motive current", which flows in the series resonant LCR circuit is proportional to the drive speed, namely the rotational speed, of the vibration actuator 100. Here, the impedance of the LCR series circuit increases and decreases by causing changes of the frequency of the impressed alternating voltage (termed hereinbelow, "drive frequency"). Accordingly, the magnitude of the motive current can be caused to change by variably controlling the drive frequency, and as a result it becomes possible to control the drive speed of the vibration actuator 100.

The drive device of a prior art vibration actuator is next described. FIG. 10 is a block diagram showing a prior art drive device which drives a vibration actuator. In FIG. 10, the control circuit 1 is a circuit which controls the drive frequency of the vibration body 100-4 by a voltage value $V_f$ which it outputs to a voltage controlled oscillator (VCO) 2.

The VCO2 is a circuit which outputs a square wave signal $S_a$ having a frequency corresponding to the value of the input voltage value $V_f$. The VCO 2 is connected on its output side to a direct current/alternating current (DC-AC) converter 3A and a phase shifter 5, and respectively outputs a pair of signals Sa to DC-AC converter 3A and phase shifter 5.

The phase shifter 5 is a circuit which forms a square wave signal $S_b$ whose phase is shifted by 90° or by 270° (−90°) with respect to the input signal $S_a$, and outputs it to the DC-AC converter 3B. Here, whether the phase shifter causes a phase shift of 90° or 270° is set by the direction of rotation of the actuator 100.

The DC-AC converters 3A, 3B are circuits which give rise to alternating voltages of the same frequency as the input signals $S_a$ or $S_b$, using electric power supplied from a direct current (DC) power supply 4. The DC-AC converters 3A, 3B output the generated alternating voltages to the respective input electrodes 100-4a or 100-4b of the vibration body 100-4. Traveling waves are thus formed in the stator of the vibration actuator 100 and drive the rotor frictionally.

The DC-AC converters 3A and 3B are next described. The DC-AC converters 3A and 3B differ only in the point of different phase of the signals which are input thereto and the alternating voltages which they output. Other than this, their constitution and operation are the same. Consequently, only DC-AC converter 3A is described hereinbelow.

The DC-AC converter 3A is constituted by a n-type field effect transistor ("FET") 31a, an inductive element 32a and, inserted as necessary, a diode 33a. The FET 31a has its gate terminal connected to the output side of the VCO 2, and thus has input thereto the output signal $S_a$ of the VCO 2. On the other hand, the source terminal is grounded, and the drain terminal is connected to the inductive element 32a. Furthermore, the drain terminal is also connected to the electrode 100-4a of the vibration actuator 100, such that the output signal of the DC-AC converter 3A is transmitted to the electrode 100-4a. Moreover, the end of the inductive element 32a which is not connected to the FET 31a is connected to the direct current power supply 4.

FIGS. 11(A)–11(B) are graphs which illustrate the operation of the DC-AC converters 3A and 3B. The graph of FIG. 11(A) represents the output signal $S_a$ of the VCO 2. Moreover, the repetition frequency of the signal $S_a$, is denoted by f. When the signal $S_a$ is "H", the FET 31 is in the switch ON state, and grounds the input electrode 100-4a of the vibration body 100-4. At this time, the inductive element 32a, because it is in a state equivalent to having been connected in parallel with the DC power supply 4, flows current through the FET 31a. As a result, energy is stored in the inductive element 32a according to the magnitude of this current.

When the signal $S_a$ becomes "L", the FET 31a is in a switch OFF state. Because of this, the inductive element 32a emits the stored energy as energy of a resonant vibration of the inductance value of the inductive element 32a and the capacitance value of the vibration body 100-4.

Here, the inductance value of the inductive element 32a is selected such that the half period of the resonant vibration is shorter than the interval in which the signal $S_a$ is "L". As shown in the graph in FIG. 11(B), a half wave alternating voltage, of oscillation frequency f and oscillation voltage $V_{E'}$ is impressed on the input electrode 100-4a of the vibration body.

Moreover, the diode 33a performs the function of preventing a negative voltage from being impressed on the drain terminal of the FET 31a in the interval $T_x$ shown in FIG. 11 (B).

FIG. 12 is a graph showing the relationship of the vibration frequency f and the drive speed N of the vibration actuator, in a drive device of a prior art vibration actuator.

As shown in FIG. 12, the vibration actuator is not driven at a drive frequency f which is higher than $f_0$. Driving commences at $f_0$, and after this, the lower the drive frequency f becomes, the greater the drive speed N at which the vibration actuator is driven. When the drive frequency f is lowered ether, the drive speed N suddenly falls or stops at a frequency $f_3$. This kind of sudden change of the drive speed N accompanying a fall of the drive frequency f is generally termed a "cogging phenomenon".

3

Accordingly, in order to prevent such a cogging phenomenon, the vibration actuator has to be driven by a drive frequency in the range of $f_0$–$f_2$, where the frequency $f_2$ is limited to being somewhat higher than the frequency $f_3$. However, the frequency $f_3$ at which the cogging phenomenon arises is one which changes with temperature and the like, and the frequency $f_2$ cannot be specified. Because of this, a problem occurs in which, when the drive frequency f was lowered in order to drive the vibration actuator at a higher speed, the drive frequency f became a value lower than $f_3$, and the vibration actuator suddenly stopped, contrary to intention.

SUMMARY OF THE INVENTION

Accordingly, it is an object of the present invention to provide a drive device of a vibration actuator which can cause stable driving of the vibration actuator by preventing in advance the occurrence of a cogging phenomenon.

Objects of the present invention are achieved by a drive device of a vibration actuator comprising a control circuit to output a control signal of a frequency which is to drive an electromechanical conversion element, a drive circuit to impress on the electromechanical conversion element an alternating voltage of the same frequency as the control signal, and a direct current power supply to supply electric power to the drive circuit, wherein the drive circuit includes an inductive element connected in series or in parallel with the electromechanical conversion element, and a switching element to open and close at the same frequency as the control signal, connected such that the voltage of the direct current power supply is impressed on the inductive element, and wherein the control circuit limits the range of variation of the frequency of the control signal, based on a current value which flows in the switching element.

Further objects of the present invention are achieved by a drive device of a vibration actuator comprising a drive circuit including an inductive element connected in series or in parallel with an electromechanical conversion element of the vibration actuator, a switching element to open and close at the same frequency as a control signal, and a resistive element connected in series with the inductive element when the switching element is on.

Still further objects of the present invention are achieved by a method of driving a vibration actuator using a drive circuit having an inductive element in series or in parallel with an electromechanical conversion element of the vibration actuator, a switching circuit that opens and closes at the same frequency as a control signal from a control circuit, and a resistive element in series with the inductive element when the switching element is on, the method comprising supplying a drive signal to the vibration actuator from a connection between the inductive element and the switching element, and controlling a frequency at which the vibration actuator is driven by limiting a range of frequency of the control signal, based on a value of the current flowing in the switching element.

BRIEF DESCRIPTION OF THE DRAWINGS

These and other objects, features and characteristics of the present invention will become apparent to one skilled in the art from a study of the following detailed description and the appended claims and drawings, all of which form a part of this specification. In the drawings:

FIGS. 5(A)–5(D) are graphs depicting the relationship of the voltage waveform $V_R$ and the signals $S_S$, $S_H$, and $S_r$;

DESCRIPTION OF THE PREFERRED EMBODIMENTS

Descriptions are given in further detail hereinbelow of embodiments of the present invention, with reference to the accompanying drawings. Moreover, in the following, portions which perform a function similar to that which has been described for the related art technology are given the same reference symbols, and duplicate descriptions are suitably omitted. Moreover, piezoelectric elements, electrostrictive elements and the like which are used as the electromechanical conversion element are given the general name "vibration body".

First Embodiment

Figure 1:
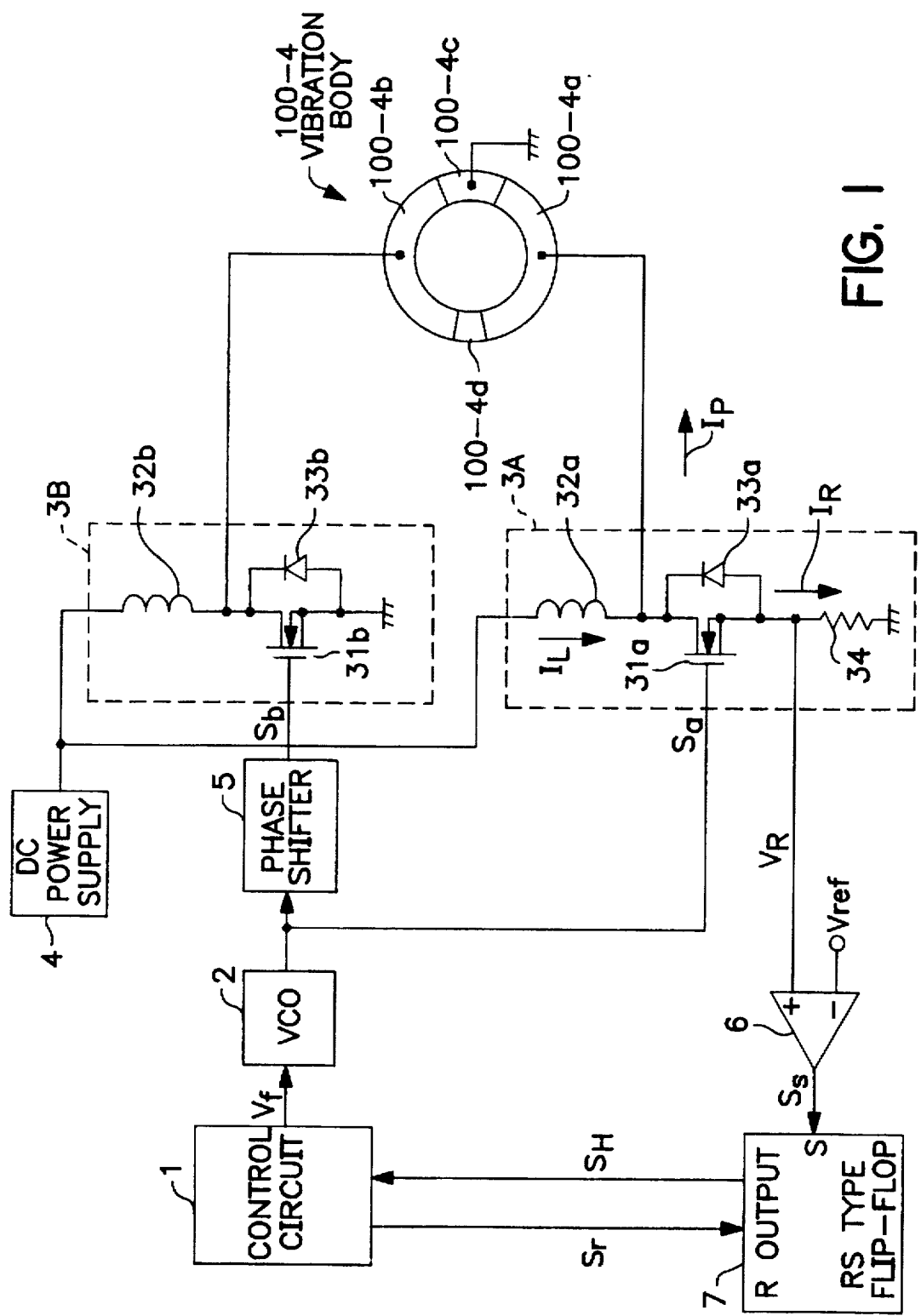
FIG. 1 is a diagram showing the drive circuit of a vibration actuator according to a first preferred embodiment of the present invention.
Figure 2A:
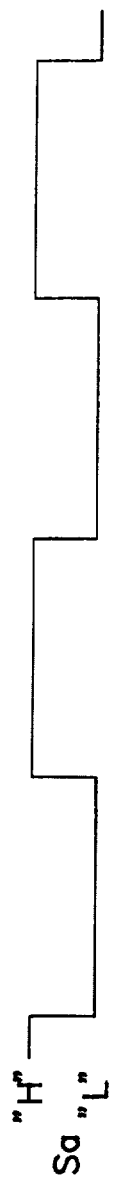
FIGS. 2(A)–2(D) are graphs illustrating current waveforms in the DC-AC converter of the first embodiment.
Figure 2B:
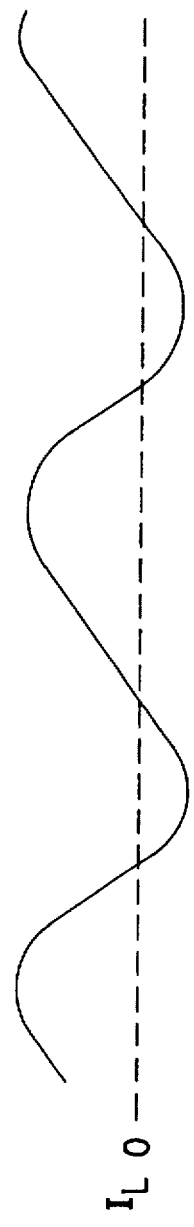
Figure 2C:
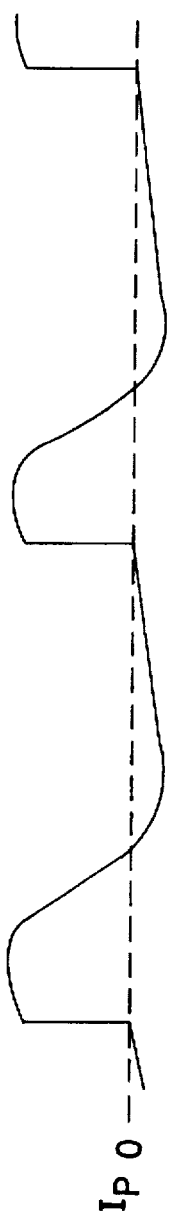
Figure 2D:
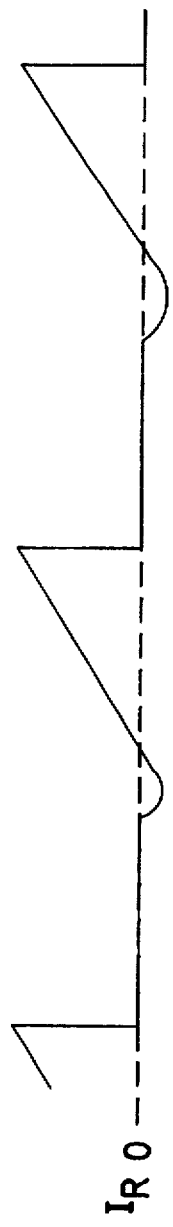

FIG. 1 is a diagram showing a drive device of a vibration actuator according to a first preferred embodiment of the present invention. This embodiment differs from the prior art, for example, where the DC-AC converter 3A includes a resistor 34. Moreover, the drive device is equipped with a comparator 6, and an RS type flip-flop (RS-FF) 7 between the control circuit 1 and the DC-AC converter 3A.

The resistor 34, which the DC-AC converter 3A includes, is a resistor which has been arranged for current detection use. The resistor 34 is connected by one terminal to the source terminal of FET 31a, and has its other terminal grounded. Consequently, by detecting the voltage at the FET 31a side of the resistor 34, it is possible to detect the current flowing in the FET 31a, or to detect the current supplied to inductive element 32a from DC power supply 4 in the time the FET 31a is in the ON state. Consequently, in this embodiment, in order to monitor the current supplied to the inductive element 32a from the DC power supply 4, the terminal of the resistor 34 on the FET 31a side is furthermore connected to the positive input terminal of a comparator 6.

The comparator 6 is a circuit which has a predetermined voltage $V_{ref}$ impressed on the negative input terminal, and which, by comparing the voltage impressed on the positive input terminal with $V_{ref}$ detects whether a current greater dan a predetermined value is flowing in the FET 31a. The comparator 6 is connected to the RS-FF 7, and outputs a comparison output signal (set signal $S_S$) to the RS-FF 7.

The RS-FF is a circuit which, based on the output signal $S_s$ of the comparator 6, in the case of necessity outputs to the control circuit 1 a signal, the range of variation of the output voltage $V_f$ of which is to be limited. The RS-FF 7 is connected to the control circuit 1 so that it can output a signal $S_H$ to the control circuit 1, and moreover, so that it can have input thereto a reset signal $S_R$ which the control circuit 1 outputs.

The operation of the first preferred embodiment will next be described.

FIGS. 2(A)–2(D) are graphs showing the current waveforms in the DC-AC convener 3A. In FIGS. 2(A)–2(D), there are shown in the successive graphs the square wave signal $S_a$ which is input to the DC-AC converter 3A (FIG. 2(A)), the current $I_L$ flowing in the inductive element 32a (FIG. 2(B)), the current $I_p$ flowing in electrode 100-4a of vibration body 100-4 (FIG. 2(C)), and the current $I_R$ flowing in the FET 31a and resistor 34 (FIG. 2(D). Each current has a positive direction as indicated by the direction of the arrows in FIG. 1. Here, the current waveform of the current $I_R$ is detected as a voltage waveform $V_R$ in the resistor 34. Moreover, the relationship $I_L=I_P+I_R$ is established between $I_L$, $I_P$, and $I_R$.

Figure 3:
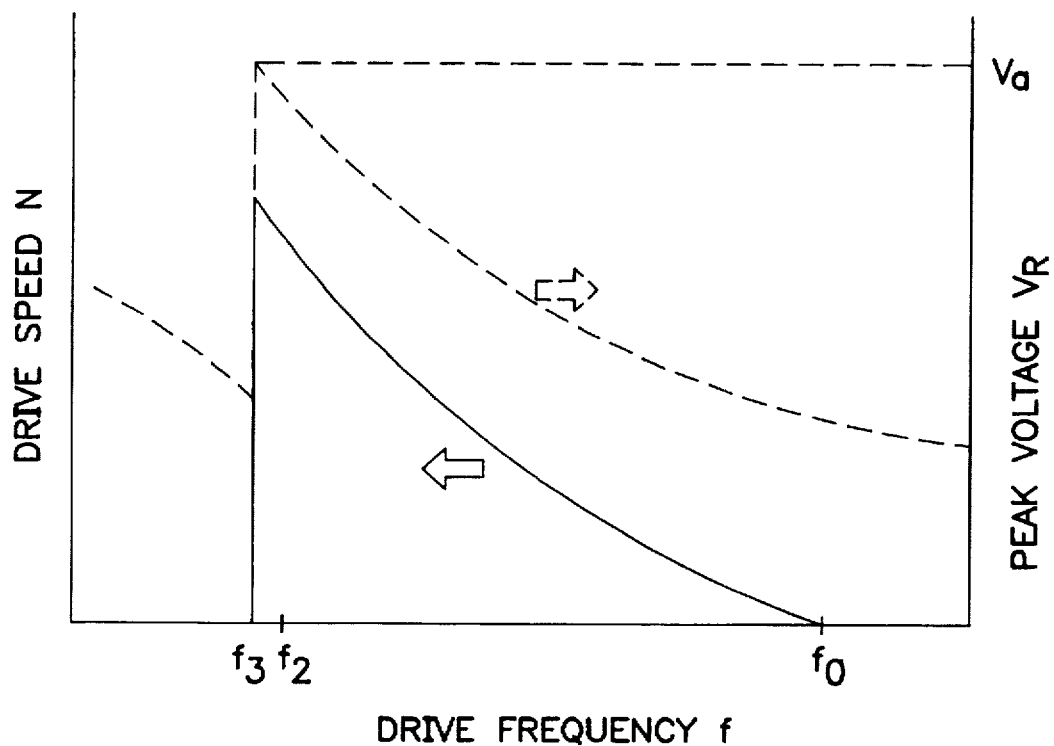
FIG. 3 is graph showing the relationship of the drive speed and the peak voltage to the drive frequency.

FIG. 3 is a diagram showing the relationship of the drive speed N of the vibration actuator and the voltage waveform $V_R$ to the drive frequency f in this mode of embodiment. The peak voltage value of the voltage waveform $V_R$ becomes large together with the drive speed N, and similarly suddenly falls when the drive speed N suddenly falls at the frequency $f_3$. Here, the peak voltage value of the voltage waveform $V_R$ at the drive frequency showing the maximum value of the drive speed N is denoted by $V_a$.

Figure 4:
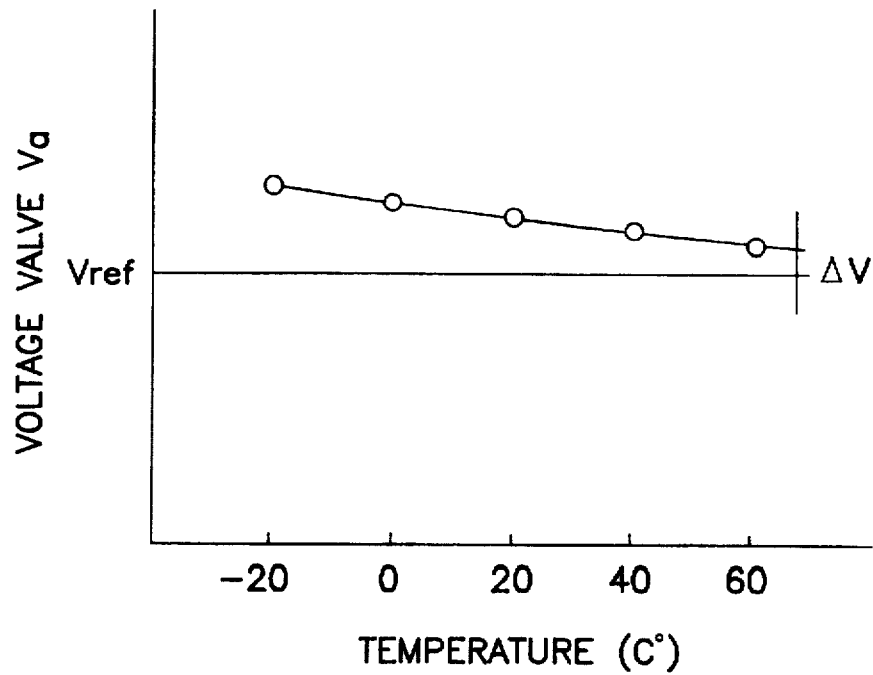
FIG. 4 is a graph of the relationship of the peak voltage value $V_a$ to temperature.

FIG. 4 is a diagram showing the relationship between the value of $V_a$ and the ambient temperature where the vibration actuator is located. As is seen in FIG. 4, the value of $V_a$ gradually falls as the temperature becomes higher. Here, in this embodiment, $V_{ref}$ was set at a voltage value which is below he lowest value of $V_a$ in FIG. 4 by a predetermined amount $\Delta V$, and was impressed on the negative input terminal of the comparator 6.

In this embodiment, in the case of starting the vibration actuator, the control circuit 1 outputs a signal $V_f$ having a predetermined voltage value. This allows the DC-AC converters 3A, 3B to impress on the vibration body 100-4 an alternating voltage whose frequency is higher than $f_0$. Next, the control circuit 1, by gradually causing the voltage value of the voltage signal $V_f$ to change, causes the drive frequency of the vibration actuator to fall as far as a value which drives at the desired drive quantity.

The comparator 6 compares the voltage waveform $V_R$ input from the positive input terminal with $V_{ref}$ input at the negative input terminal. As a result of this comparison, when the peak voltage of the voltage waveform $V_R$ is close to the frequency $f_3$ at which the cogging phenomenon arises, the comparator 6 outputs for just a fixed interval an "H" comparison output signal $S_S$.

Figure 5A:
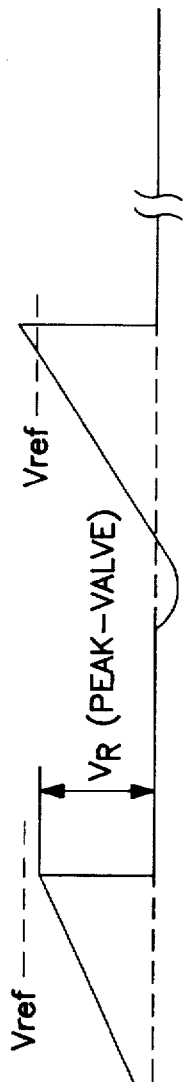
Figure 5A:
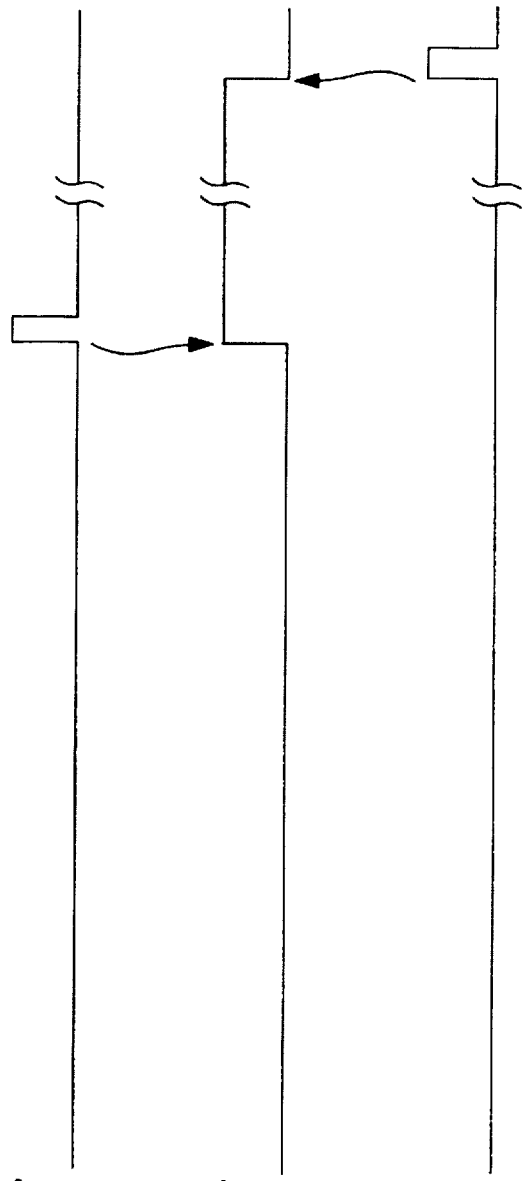

FIGS. 5(A–5(D) are graphs which show the relationship of the change of the voltage waveform $V_R$ (FIG. 5(A)), and the change of the output signal $S_S$ and the like. As shown by FIG. 5(B), when the signal $S_S$ becomes "H", the RS-FF 7 is set, namely, the output signal $S_H$ of the RS-FF 7 becomes "H", and informs the control circuit 1 that the drive frequency f has become close to the frequency $f_3$ at which the cogging phenomenon occurs.

The control circuit 1, when the signal $S_H$ becomes "H" as shown in FIG. 5(C), determines that the drive frequency f at this time is at the lower limit of frequencies at which it is possible to drive the vibration actuator. Hence, no further decrease in the drive frequency f is allowed, or the output voltage $V_f$ is controlled so as to shift it to the higher frequency side. After this, the control circuit 1 outputs one pulse "H" in the output signal $S_r$ as depicted in FIG. 5(D) to the RS-FF 7. The RS-FF 7, when it confirms "H" in the output signal $S_r$, initializes the output signal $S_H$ to "L".

Next, the operations which the vibration actuator and control circuit 1 evince are described in the case that a moving material body (simply termed a "material body" below) is driven by the vibration actuator as far as the target position $P_n$.

Figure 6A:
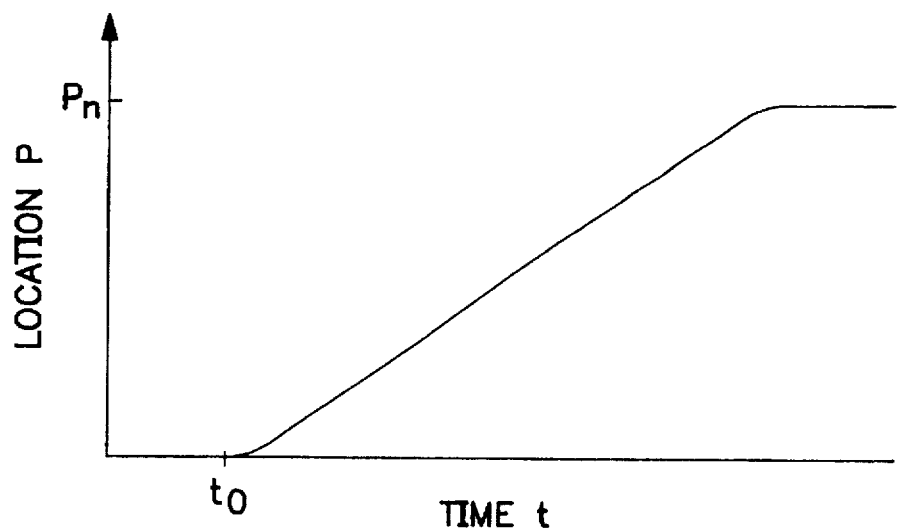
FIGS. 6(A)–6(B) are graphs illustrating the general motion of the vibration actuator when driving a material body.
Figure 6B:
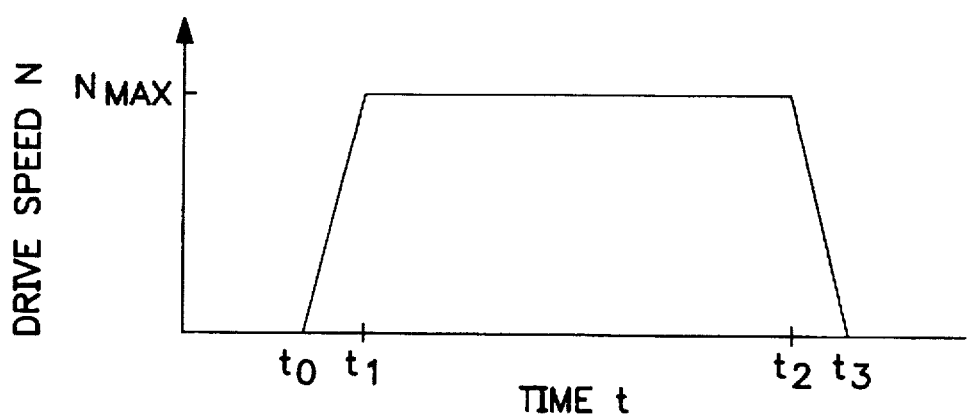

FIG. 6(A) is a graph showing the relationship between the time t and the location P of the material body, in which the time when the vibration actuator is stared has been denoted by $t_0$. FIG. 6(B) is a graph showing the drive speed N of the vibration actuator at time t. As shown in FIG. 6(B), the drive quantity of the vibration actuator which was started at time $t_0$ reaches the maximum drive speed $N_{MAX}$ at time $t_1$, decreases in speed from the instant $t_2$, and stops at the instant $t_3$ when the material body reach the target location $P_n$. The time required for the material body to reach the target location becomes shorter as the maximum drive speed $N_{MAX}$ becomes larger.

Figure 7:
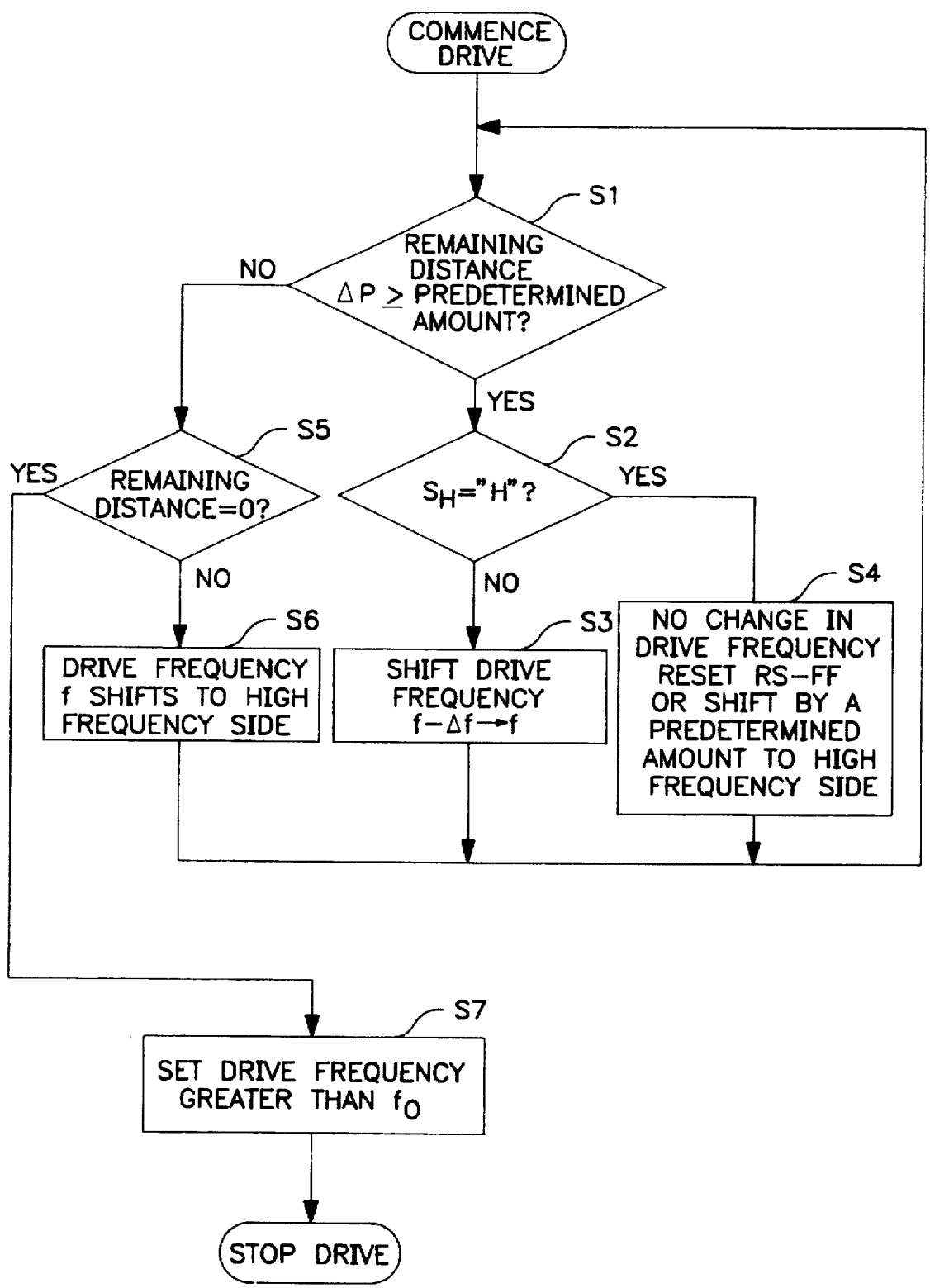
FIG. 7 is a flow chart showing the operation of the control circuit of the first embodiment.

FIG. 7 is a flow chart which shows the operations which the control circuit 1 performs when it controls the motion of the vibration actuator.

The control circuit 1 is such as to generate in the DC-AC converters 3A and 3B a drive frequency $f_0$ which commences rotation of the vibration actuator when the drive commences, and outputs a voltage signal $V_f$ of predetermined value to the VCO 2 (not shown in the drawing). Moreover, the output of the RS-FF 7 is reset beforehand to "L".

In step S1, the control circuit 1 compares the present position P of the material body and the target position $P_n$, and if their difference (remaining distance: $P_n$-P) $\Delta$P is more than a predetermined amount, proceeds to step S2, and if less than the predetermined amount, proceeds to step S5.

In step S2, the relationship is determined of the drive frequency f at this time and the lower limit frequency. Namely, in the case that the signal $S_H$ is "L", determining that the drive frequency f is not below the lower limit frequency, the control circuit 1 proceeds to step S3. In the case that the signal $S_H$ is "H", and thus determining that the drive frequency is below the lower limit frequency, the process proceeds to step S4.

In step S3, the control circuit 1 causes its output signal $V_r$ to change such that the frequency f shifts by a predetermined quantity $\Delta$f to the low frequency side. Hence, the drive speed of the actuator 100 increases. Here, the predetermined quantity $\Delta$f is preferably made a value within a range which can result in a smooth acceleration. At the end of step S3, the operation of the control circuit 1 returns to step S1.

In step S4, because the drive frequency f has reached the lower limit frequency, the control circuit 1 does not perform any alteration of the drive frequency f, or the control circuit 1 causes a shift by a predetermined amount to the high frequency side. In the present embodiment, the vibration actuator is prevented in advance from having its drive suddenly stopped. Moreover, in the case that the control circuit 1 shifts the drive frequency f by a predetermined amount to the high frequency side, the actuator 100, even when it is used in an environment subject to sudden temperature changes and the like, more effectively stops the occurrence of the cogging phenomenon. After the end of step S4, the control circuit 1 outputs a reset signal to the RS-FF 7, and returns to step S1.

In step S5, the control circuit 1 performs a determination of whether or not the remaining distance of the material body to the target location is zero. As a result, respectively, in the case that the remaining distance is not zero the control circuit 1 proceeds to step S6. In the case that the remaining distance is zero, it proceeds to step S7.

In step S6, because the distance is a small value where ΔP is less than a predetermined amount, it is not necessary for the control circuit 1 to drive the vibration actuator at the highest speed. Consequently, the control circuit 1 causes the drive frequency f to shift to the high frequency side by appropriately adjusting the output voltage $V_f$. Thus, the drive speed of the vibration actuator is controlled such that the speed gradually decreases, according to the remaining distance. When the process of step S6 ends, the control circuit returns to step S1.

In step S7, the remaining distance is zero, namely, the material body reaches the target location. Consequently, the control circuit 1 controls the drive frequency f of the vibration actuator so as to make the drive frequency greater than $f_0$, and the drive of the vibration actuator stops.

Second Embodiment

Figure 8:
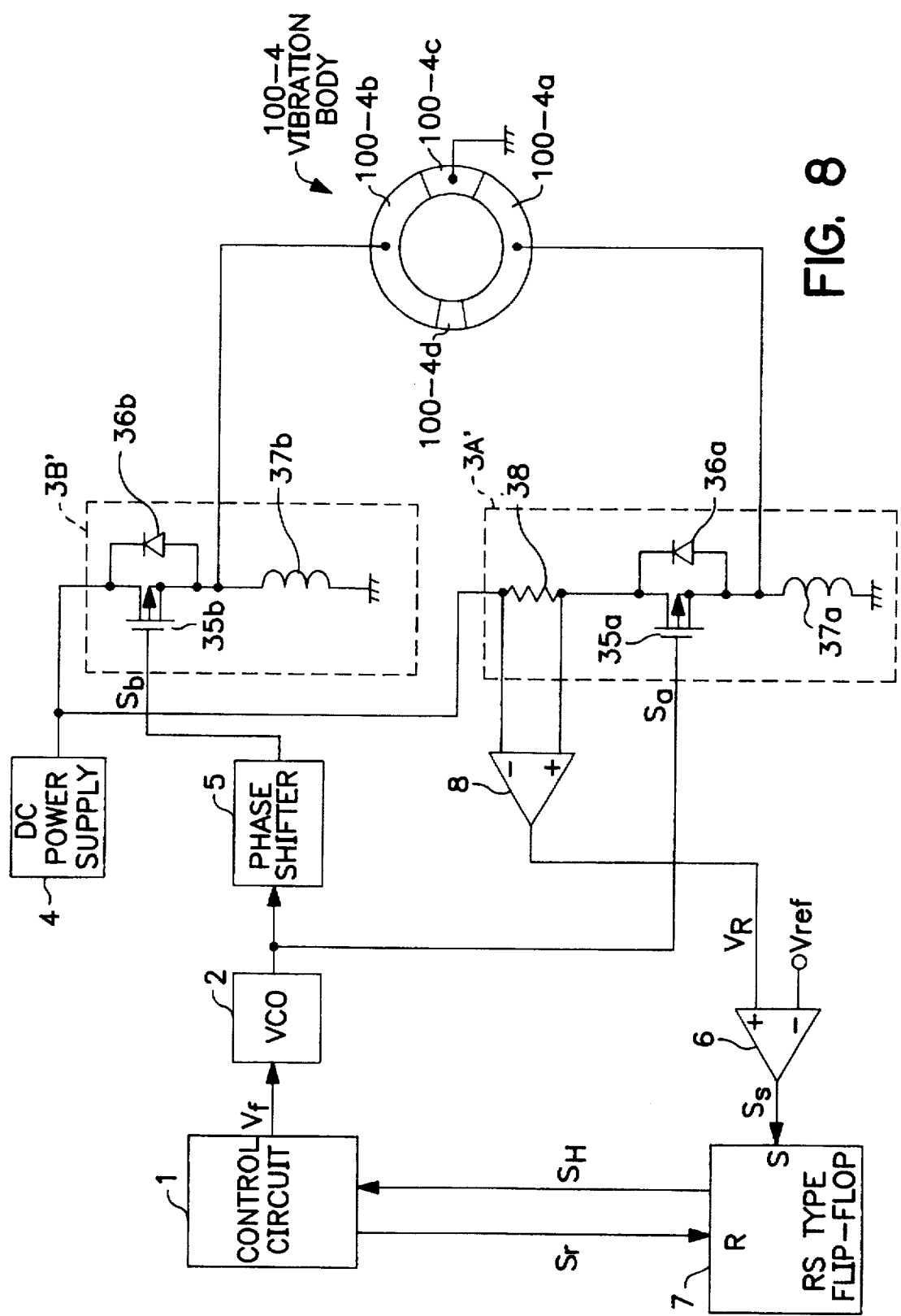
FIG. 8 is a diagram showing the drive circuit of a vibration actuator according to a second preferred embodiment of the present invention.
Figure 9A:
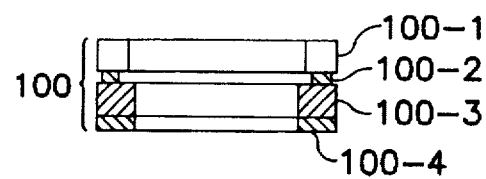
FIGS. 9(A)–9(C) are diagrams showing the general constitution of a prior art vibration actuator.
Figure 9B:
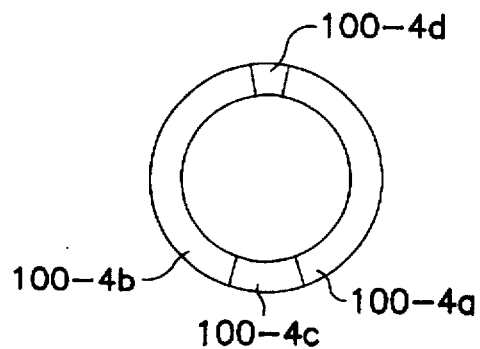
Figure 9C:
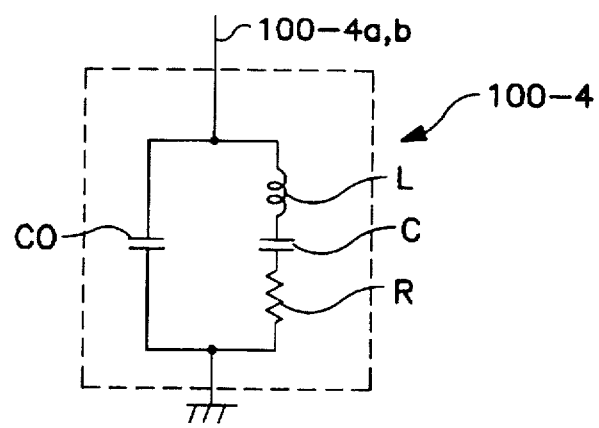
Figure 10:
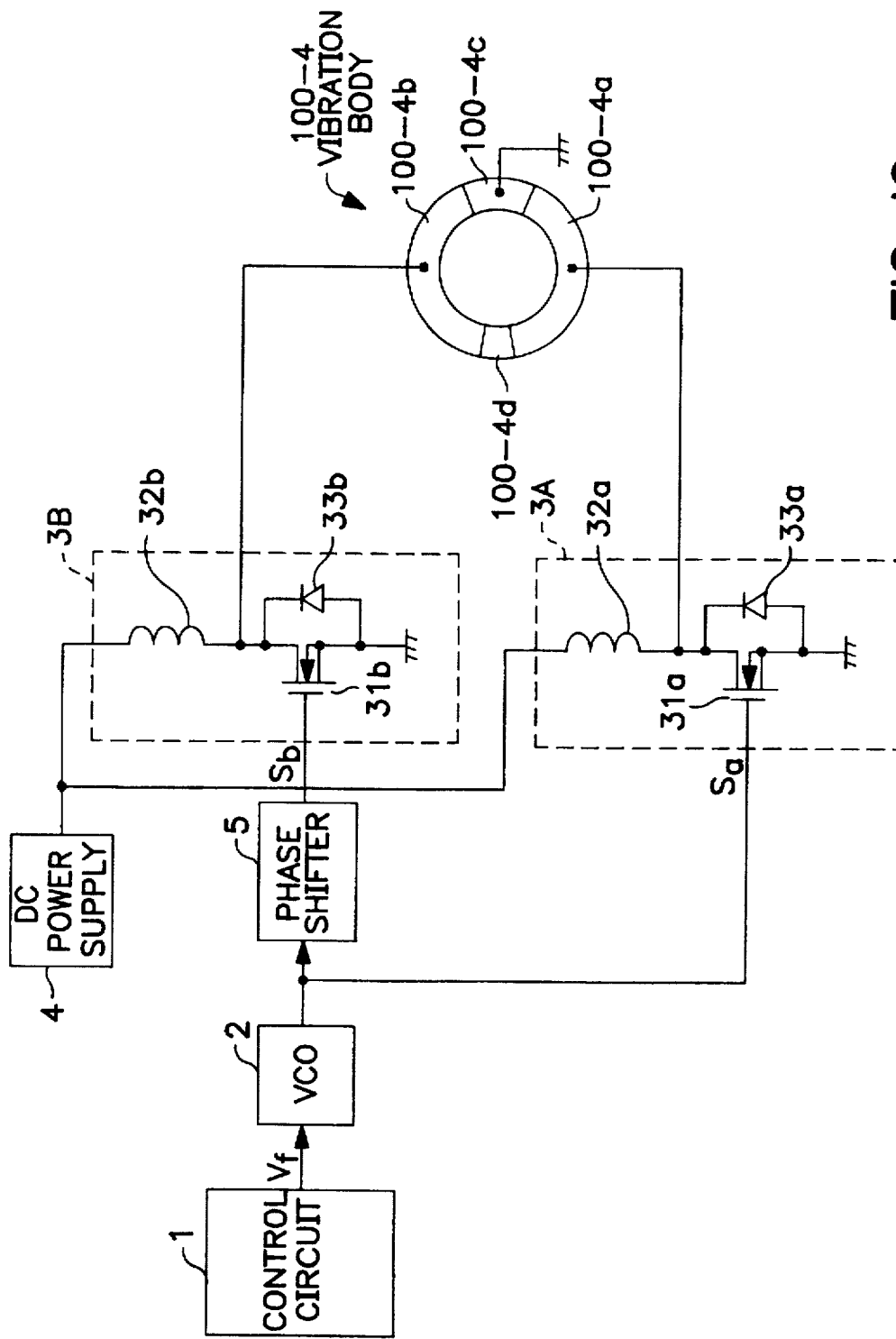
FIG. 10 is a block diagram showing the drive device of a prior art vibration actuator.
Figure 11A:
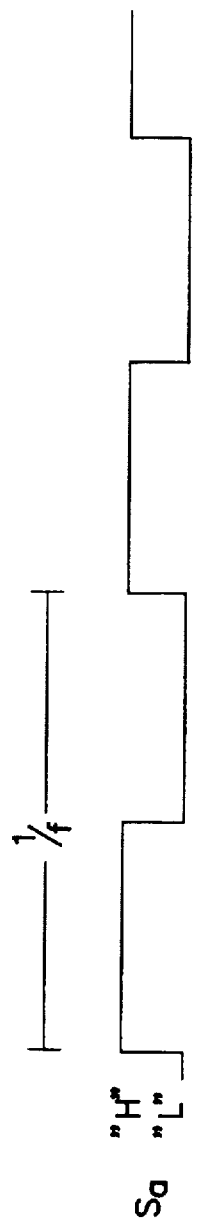
FIGS. 11(A)–11(B) are graphs describing the operation of the DC-AC converter in the drive device of a prior art vibration actuator.
Figure 11B:
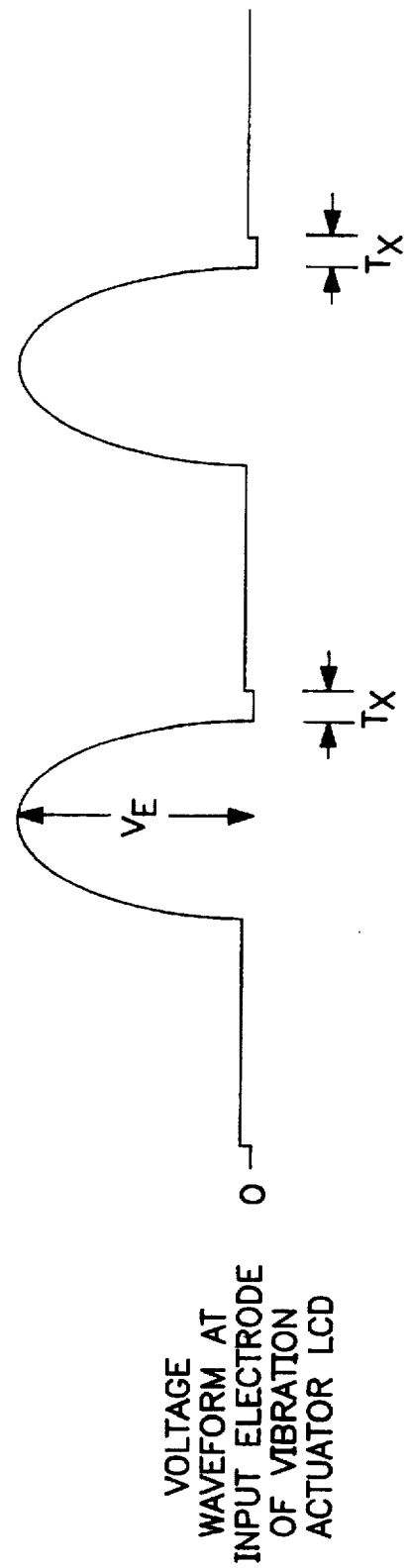
Figure 12:
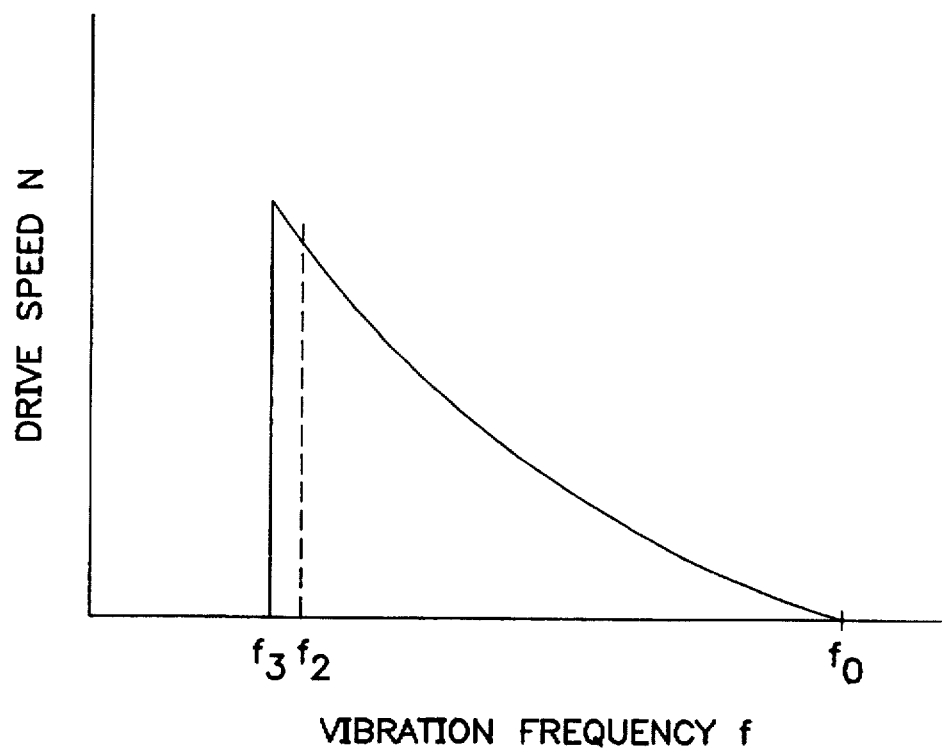
FIG. 12 is a diagram showing the relationship of the drive frequency and the drive speed of a vibration actuator, in the drive device of a prior art vibration actuator.

FIG. 8 is a diagram showing the drive device of a vibration actuator for a second preferred embodiment according to the present invention. This embodiment differs from the first embodiment in the internal constitution of the DC-AC converters 3A', 3B'. Furthermore, it differs from the first embodiment in that the second embodiment is equipped with a differential amplifier 8.

The DC-AC converter 3A' will be described. In this embodiment, the input signal $S_a$ is input to the gate terminal of p-type FET 35a, which functions as a switching element. The source terminal of the FET 35a is connected to the DC power supply 4 via a resistor 38. Here, the resistor 38 is a resistor in order to detect the current which flows in the FET 35a, and is similar to the resistor 34 in the first embodiment. The drain terminal of the FET 35a is connected to the inductive element 37a, whose other terminal is grounded, and in addition to an electrode 100-4a of the vibration body 100-4. The output voltage of the DC-AC converter 3A' is impressed on the vibration body 100-4.

The differential amplifier 8 has its positive and negative input terminals respectively connected to the two terminals of the resistor 38. This allows the differential amplifier 8 to output a voltage which is proportional to the current flowing in the FET 35a, and which is input to the positive input terminal of the comparator 6. Namely, the output signal of the differential amplifier 8 corresponds to the signal $V_R$ in the first embodiment.

By the above constitution, the present embodiment makes it possible to obtain effects similar to those of the first embodiment. Moreover, the difference in the DC-AC converters 3A' and 3B' is only in the point of whether or not a resistor is inserted between the direct current power supply 4 and the FET 35b. The DC-AC converters 3A' and 3B' are similar in other points to the DC-AC converters 3A and 3B of the first embodiment.

Other Embodiments

Moreover, the present invention is not limited to the above embodiments. The above embodiments are exemplary, and any design which has the technological concepts and essentially the same constitution as stated in the claims of the present invention, and confers similar effects of operation, is also included within the technological scope of the present invention.

In the above embodiments, an annular form of ultrasonic motor or a disc form of ultrasonic motor and the like annular form of vibration actuator have been described. However, it is possible to apply the technological scope according to the present invention to linear forms of ultrasonic motors and the like linear forms of vibration actuators.

Moreover, in the above embodiments, a field effect transistor has been described, for example, for use as the switching element in the DC-AC converter. However, there is no limitation to this kind of switching element, and other kinds of elements may also be used.

In the above embodiments, the case has been described of the input of a constant voltage $V_{ref}$ to the negative input terminal of the comparator 6, but it is not necessary for $V_{ref}$ to be constant. For example, the voltage value $V_a$ shown in FIG. 4, so as to have a normally constant voltage difference at an optional temperature, may be one which changes with the environmental temperature. The circuits of the preferred embodiments, it goes without saying, may be constituted by a microcomputer and the like.

The above preferred embodiments of the present invention as described in detail hereinabove, are used in a drive device of a vibration actuator, with the drive circuit having an inductive element connected in series or in parallel with an electromechanical converting element, and a switching element connected such as to impress the voltage of a direct current power supply on the inductive element. The control circuit, because it limits the possible range of frequencies of the control signal based on the current value flowing in the switching elements of the drive circuit, prevents the occurrence of a cogging phenomenon in the vibration actuator, and makes it possible to drive the vibration actuator in a stable mamnner.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A drive device of a vibration actuator comprising:

a control circuit to output a control signal of a frequency which is to drive an electromechanical conversion element;

a drive circuit to impress on te electromechanical conversion element an alternating voltage of the same frequency as the control signal; and a direct current power supply to supply electric power to the drive circuit, wherein the drive circuit includes an inductive element connected in series or in parallel with the electromechanical conversion element, and a switching element to open and close at the same frequency as the control signal, connected such that voltage of the direct current power supply is impressed on the inductive element, and wherein the control circuit limits the range of variation of the frequency of the control signal, based on a value of the current which flows in the switching element.

2. A drive device of a vibration actuator according to claim 1, wherein the control circuit includes a current detection circuit to detect the value of the current flowing in the switching element;

a comparison circuit to compare an output value of the current detection circuit with a predetermined value; and a circuit to limit a lowest value of a frequency of the control signal, based on an output of the comparison circuit.

3. A drive device of a vibration actuator comprising:

a drive circuit including an inductive element connected in series or in parallel with an electromechanical conversion element of the vibration actuator, a switching element to open and close at the same frequency as a control signal, and a resistive element connected in series with the inductive element when the switching element is on.

4. A drive device of a vibration actuator according to claim 3, further comprising a power source connected to said inductive element.

5. A drive device of a vibration actuator according to claim 3, further comprising a control circuit to output a control signal of a frequency to drive said electromechanical conversion element of said vibration actuator.

6. A drive device of a vibration actuator according to claim 5, wherein the control circuit limits the range of variation of the frequency of the control signal, based on a value of the current which flows in the switching element.

7. A drive device of a vibration actuator according to claim 5, wherein the control circuit includes a current detection circuit to detect the value of the current flowing in the switching element;

a comparison circuit to compare an output value of the current detection circuit with a predetermined value; and a circuit to limit a lowest value of a frequency of the control signal, based on an output of the comparison circuit.

8. A drive device of a vibration actuator according to claim 3, further comprising an RS flip flop connected to an output of said drive circuit.

9. A drive device of a vibration actuator according to claim 8, further comprising a comparator disposed between said RS flip flop and said drive circuit.

10. A method of driving a vibration actuator using a drive circuit having an inductive element in series or in parallel with an electromechanical conversion element of the vibration actuator, a switching circuit that opens and closes at the same frequency as a control signal from a control circuit, and a resistive element in series with the inductive element when the switching element is on, the method comprising:

supplying a drive signal to the vibration actuator from a connection between the inductive element and the switching element; and controlling a frequency at which the vibration actuator is driven by limiting a range of frequency of the control signal, based on a value of the current flowing in the switching element.

* * * * *

UNITED STATES PATENT AND TRADEMARK OFFICE
CERTIFICATE OF CORRECTION

PATENT NO. : 5,777,445
DATED : July 7 1998
INVENTOR(S) : Kiyoshi Motegi

It is certified that error appears in the above-indentified patent and that said Letters Patent is hereby corrected as shown below:

Column 8, line 45, claim 1, change "te" to --the--.

Signed and Sealed this

Fifteenth Day of December, 1998

Attest:

BRUCE LEHMAN

*Attesting Officer*     Commissioner of Patents and Trademarks